Figure 1:
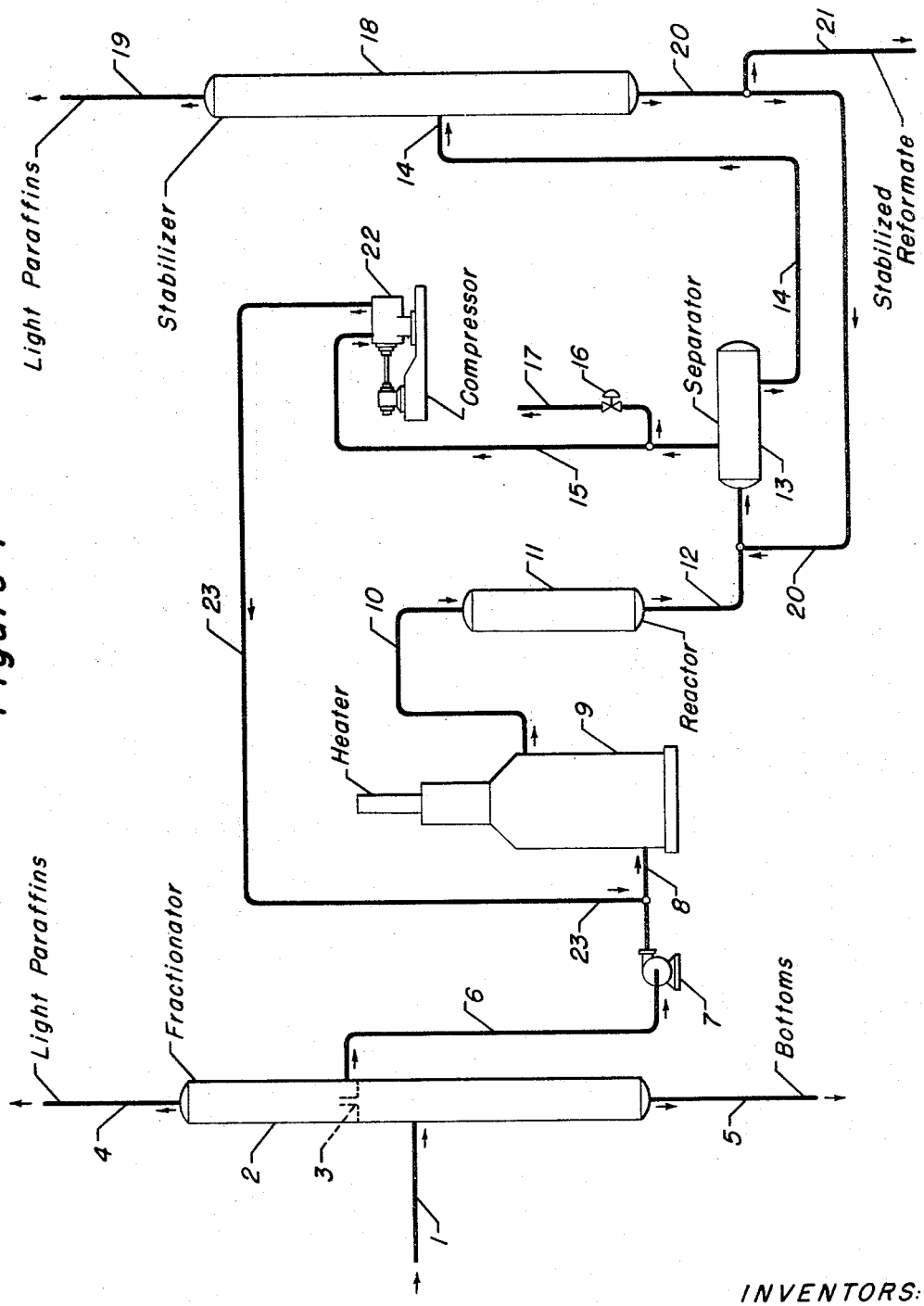

INVENTORS:
George J. Czajkowski
Peter E. Liakakos
BY:
Chester J. Giuliani
James R. Hoatson, Jr.
ATTORNEYS Jan. 3, 1967 G. J. CZAJKOWSKI ETAL 3,296,118
HYDROFORMING WITH A PLATINUM CATALYST
Filed June 15, 1960 2 Sheets-Sheet 2
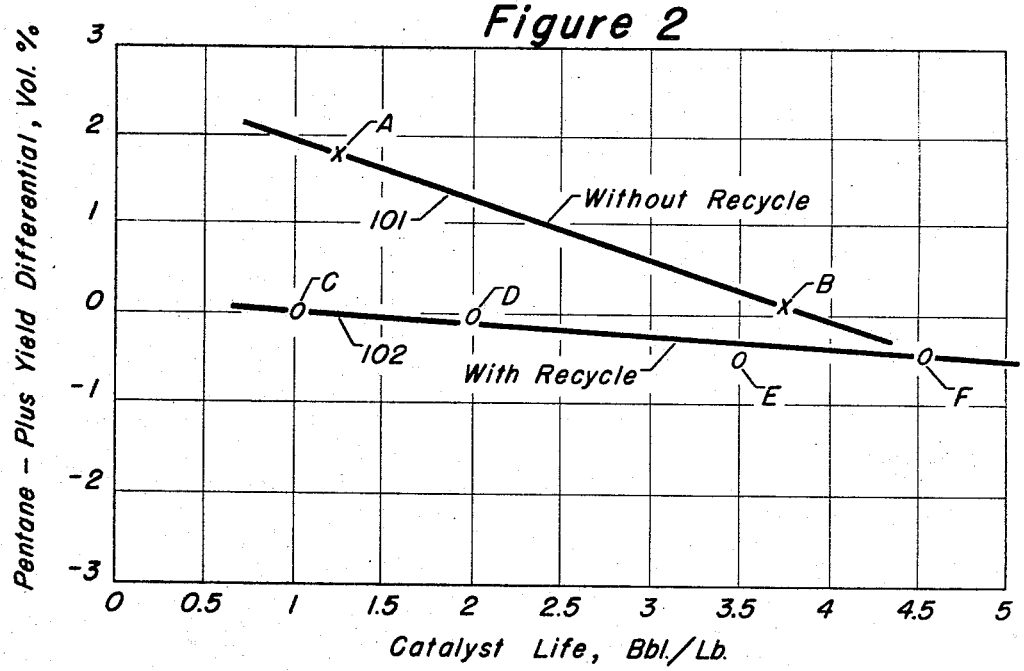
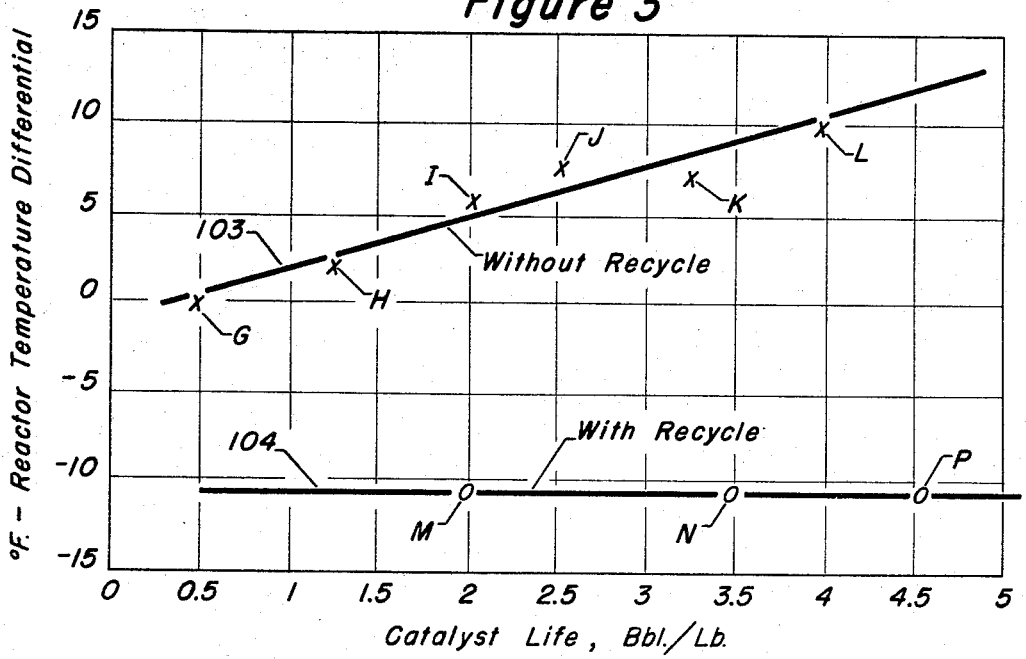
INVENTORS:
George J. Czajkowski
Peter E. Liakakos
BY:
Chester J. Giuliani
James R. Hoatson Jr.
ATTORNEYS

3,296,118
HYDROFORMING WITH A PLATINUM CATALYST
George J. Czajkowski, Chicago, Ill., and Peter E. Liakakos, Santa Fe Springs, Calif., assignors to Universal Oil Products Company, Des Plaines, Ill., a corporation of Delaware
Filed June 15, 1960, Ser. No. 36,344
5 Claims. (Cl. 208—100)

The present invention relates to a process for the catalytic conversion of hydrocarbons and mixtures of hydrocarbons. More specifically, the present invention is directed toward a process for converting gasoline boiling range hydrocarbons in contact with hydrogen and a catalyst containing at least one metallic component selected from the platinum-group of the Periodic Table.

Recent refining developments within the petroleum industry have produced a catalytic composite which is capable of converting low-quality hydrocarbons, and various mixture of hydrocarbons, into a high-quality product possessing excellent anti-knock characteristics. This catalyst, comprising at least one metallic component selected from the platinum-group of the Periodic Table and halogen, promotes desirable reforming-type reactions including, as principal reactions, the dehydrogenation of naphthenes into aromatics, the dehydrocyclization of short-chain paraffins directly to aromatics and, to a particularly controlled degree, the hydrocracking of long-chain paraffins into lower boiling normally liquid hydrocarbons. These reactions combine to effect a substantial increase in the octane rating of the hydrocarbons and hydrocarbon fractions being processed, and are especially suited to the processing of gasoline boiling range hydrocarbons including straight-run and natural gasolines, as well as thermally and catalytically cracked gasolines, and/or mixtures thereof. Furthermore, this catalyst has been found to be of great advantage in selectively promoting, at specific conditions of operation, the isomerization of cycloparaffinic hydrocarbons and low molecular weight, straight-chain hydrocarbons, such as pentanes and hexanes, and the hydro-dealkylation of alkyl-substituted aromatic hydrocarbons.

Through the appropriate selection of operating conditions, which are dependent to a great extent on the physical and/or chemical characteristics of the material orginally charged to the conversion process, whether reforming, isomerization, hydro-dealkylation, or other specific conversion processes, the catalyst is capable of being employed for an extended period of time without regeneration when reforming saturated or substantially saturated gasoline fractions, or when effecting the isomerization of substantially pure straight-chain, or relatively straight-chain, low molecular weight hydrocarbons. However, when effecting the conversion of hydrocarbons containing substantial amounts of sulfur and nitrogen, or complex compounds thereof, there is incurred the undesirable selective poisoning of the catalyst which inherently results in a decrease in the catalytic activity thereof. In addition to selective poisoning, catalyst deactivation may result from any one, or a combination of adverse effects, as for example from substances which are peculiar to a particular catalyst, and which either result in a change in the physical or chemical state of the components of the catalyst, or in a loss of said components. One of the more common forms of catalyst deactivation occurs upon the deposition of impurities which usually take the form of solids, or chemical complexes, and which shield the catalytically active centers and surfaces from the materials being processed. The deposition of coke and other heavy hydrocarbonaceous material is a direct cause of catalyst deactivation, and is generally experienced during the catalytic reforming of hydrocarbon fractions, the isomerization of substantially pure hydrocarbons, and the hydro-dealkylation of aromatic nuclei. Although such hydrocarbons, or mixtures thereof, may comprise relatively small quantities of unsaturated hydrocarbons, nitrogenous compounds and sulfurous compounds, relatively rapid deactivation results from the deposition of coke which may be effected through uncontrolled hydrocracking, and other undesirable reactions, occurring simultaneously.

The object of the present invention is to suppress effectively those reactions which are especially detrimental to catalyst activity during the hydrocarbon conversion process, increasing thereby the stability of the catalyst and, therefore, the effective period of time during which the catalyst is capable of performing its intended function to the necessary desired degree. In a broad embodiment, therefore, the present invention relates to a process for converting hydrocarbons which comprises reacting said hydrocarbons, at conversion conditions, in a reaction zone and in contact with hydrogen and a catalyst containing at least one platinum-group metallic component, separating the resultant reaction zone effluent into a hydrogen-rich gaseous phase and a liquid-hydrocarbon phase, recycling said gaseous phase to combine with said hydrocarbons, removing light paraffinic hydrocarbons from said liquid-hydrocarbon phase, and recycling at least a portion of the remaining normally liquid hydrocarbons to combine with said reaction zone effluent prior to the separation thereof into the aforesaid two phases.

In another embodiment, the present invention is directed toward a process for converting gasoline boiling range hydrocarbons which comprises reacting said hydrocarbons, at conversion conditions, in a reaction zone and in contact with hydrogen and a catalyst containing halogen and at least one platinum-group metallic component, separating the resultant reaction zone effluent into a hydrogen-rich gaseous phase and a liquid-hydrocarbon phase, recycling said gaseous phase to combine with said gasoline boiling range hydrocarbons, fractionating the liquid-hydrocarbon phase into a first fraction containing light paraffinic hydrocarbons, and a second fraction containing normally liquid hydrocarbons, and recycling at least a portion of the latter to combine with said reaction zone effluent prior to the separation thereof into the aforesaid two phases.

A more specific embodiment of the present invention affords a process for catalytically reforming gasoline boiling range hydrocarbons which comprises reacting said hydrocarbons, at conversion conditions, in a reaction zone and in contact with hydrogen and a catalyst containing from about 0.01% to about 10.0% by weight of platinum and halogen from the group of chlorine, fluorine and mixtures thereof in an amount within the range of about 0.1% to about 8.0% by weight, separating the resultant reaction zone effluent into a hydrogen-rich gaseous phase and a liquid-hydrocarbon phase, recycling said gaseous phase to combine with said gasoline boiling range hydrocarbons, fractionating the liquid-hydrocarbon phase into a first fraction containing light paraffinic hydrocarbons and butanes, and a second fraction containing normally liquid hydrocarbons and substantially free from hydrocarbons containing less than about 5 carbon atoms, and recycling said normally liquid hydrocarbons in an amount to yield a recycle ratio of from about 0.5:1 to about 10.0:1 with respect to the aforesaid gasoline boiling range hydrocarbons.

As hereinbefore set forth, one of the predominating causes of catalyst deactivation is the deposition of coke and other heavy hydrocarbonaceous material upon the catalytically active centers and surfaces of the catalyst. The deposition of such carbonaceous material appears to be effected in two stages; that is, a major proportion of the coke is deposited during the initial, early stages of the conversion operation, while the catalyst employed therein exists in its most highly active state with regard to the entire period of operation. As the period of operation is extended, the deposition of coke continues at a comparatively constant rate. The unusually high degree of coke deposition during the initial stage of operation is believed to be primarily due to the inherent ability of fresh, highly active catalyst to promote preferentially certain reactions which are detrimental to catalyst stability and activity. As more coke becomes deposited upon the catalyst, this preference diminishes until such time as it no longer exists effectively. However, at this time, the catalyst has become deactivated to the extent that it is incapable of performing is intended function to the necessary and desired degree. One particular reaction which is especially detrimental to the activity of catalytic composites comprising a platinum-group metallic component and being utilized in processes for the conversion of hydrocarbons, and which reaction appears to be selectively promoted by fresh, highly active catalyst, is demethylation. Such demethylation is particularly pronounced when the platinum-group catalyst is utilized in catalytic reforming processes, isomerization processes, hydro-dealkylation processes, and other hydrocarbon conversion reactions such as desulfurization, treating, hydrogenation, dehydrogenation, etc.

Another primary cause of catalyst deactivation is the formation of a complex mixture of highly condensed, polycyclic aromatic compounds, of which the following have been identified as two of the constituents thereof:

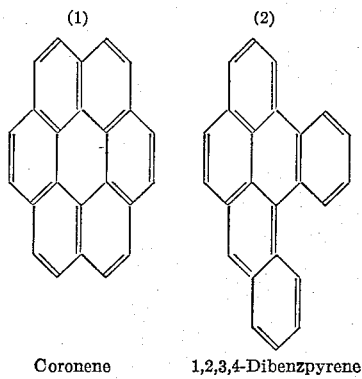

Coronene     1,2,3,4-Dibenzpyrene

As indicated by the following abbreviated chemical equations, one possible mechanism of carbon formation, as initiated by such polycyclic aromatics, is through cyclic olefin intermediates.

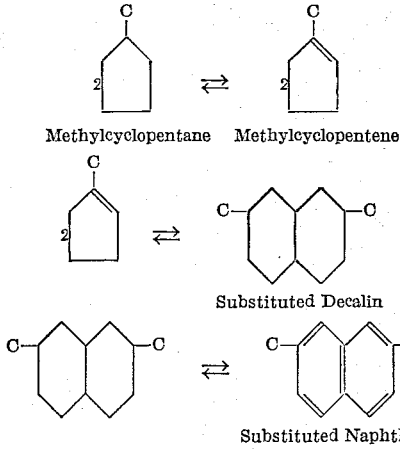

Similar successive steps result in the growth of the aromatic structure, whereby anthracene, phenanthrene, etc., and ultimately, the highly condensed aromatic structures previously identified as coronene and 1,2,3,4-dibenzpyrene, are produced. Another possible route to the highly condensed aromatic structures is through $C_2$, $C_3$ and $C_4$ olefin intermediates which react with the polycyclic aromatic nuclei to increase the polyring structure. This mechanism may be represented by the following chemical equations:

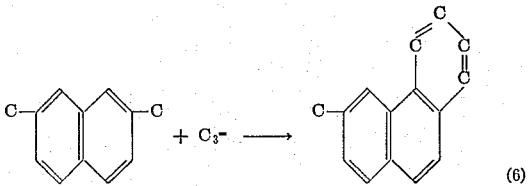

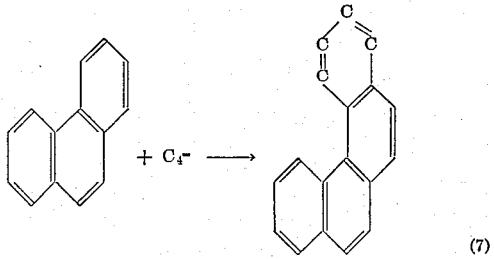

Further considerations indicate, in addition to the foregoing, that the methyl groups act to suppress further reaction and substitution. This has been evidenced by analyses of stabilized reformate product which indicate the presence of a large proportion of alpha and beta-methyl naphthalenes within the higher boiling portion of the product.

The object of the present invention is to effectively suppress those reactions which are especially detrimental to catalyst activity, increasing thereby the stability of the catalyst and, therefore, the effective period of time during which the catalyst performs its intended function to an acceptable degree. The method of the present invention reduces the quantity of these light paraffinic and olefinic hydrocarbons within the reaction zone, by which selective reactions occur with the various polycyclic aromatic compounds on the catalyst surface, whereby there is effected a decreased light hydrocarbon production, the removal of the coke precursor compounds from the catalyst surface, and the subsequent elution of these compounds from the reaction zone. The overall end result is a greatly decreased degree of carbon formation on the catalyst, whereby the effective life thereof is substantially increased.

It is not intended that the method of the present invention be unduly limited to the foregoing theoretical considerations. For example, when applied to the process of catalytically reforming gasoline boiling range hydrocarbons, the removal of $C_4$ olefinic hydrocarbons, in addition to the light paraffinic and olefinic hydrocarbons will be effected. On the other hand, although the present invention is highly advantageous in the process of isomerizing pentanes, hexanes and cycloparaffinic hydrocarbons, it is equally well adaptable to the process of isomerizing butanes, in which case the removal of $C_4$ hydrocarbons is obviously not effected to a substantial degree. The precise operation of the method of the present invention will, therefore, be dependent, to some extent, upon the process and reaction which is being effected. The necessary modifications to distinguish a catalytic reforming process from an isomerization and/or hydrodealkylation process, will be readily ascertained by one possessing skill within the art of petroleum refining and processing techniques, and it is not intended that such relatively minor modifications be removed from the generally broad scope of the present invention.

A simplified flow diagram of a catalytic reforming process is illustrated in the accompanying FIGURE 1, and comprises one embodiment of the present invention. Various valves, coolers, condensers, pumps, knockout pots, overhead reflux condensers, controllers, etc. have been reduced, or entirely eliminated, as not being essential to the complete understanding of the present invention. The utilization of these, as well as other similar appurtenances, will become obvious as the drawing is described. Referring now to FIGURE 1, a full boiling range gasoline charge stock, such as a Mid-continent naphtha, enters the process via line 1 into fractionator 2, containing centerwell 3. Fractionator 2 serves to remove light paraffinic and olefinic hydrocarbons via line 4, and heavy bottoms material through line 5. There is produced a heart-cut, withdrawn from a point above centerwell 3 via line 6 and pump 7, having an intermediate boiling range. The applicability of the catalytic reforming process to a multitude of charge stocks is well known, and it is not essential, therefore, that the heart-cut withdrawn through line 6 have a particular boiling range. In any event, the resultant intermediate naphtha charge stock is passed into line 8, and is admixed with a desired quantity of a hydrogen-rich recycle gas stream in line 23, the production of which recycle gas is hereinafter described. The mixture is raised to the desired operating temperature in heater 9, and is passed through line 10 into reactor 11. Although indicated in the drawing as passing down flow through the reaction zone, it is understood that the reactants may pass in upward flow or radial flow, and may contact the catalyst as in a moving, or fluidized, catalyst-bed design. Whether effecting catalytic reforming, isomerization, or hydrodealkylation, reactor 11 will contain a catalyst comprising a platinum-group metallic component, the precise composition of which will be dependent upon the reaction or reactions being effected. The total product effluent is removed from reactor 11 via line 12, and is passed into separating means 13. The total product effluent is separated to produce a gaseous phase rich in hydrogen, and containing some light paraffinic and olefinic hydrocarbons. The gaseous phase is indicated as leaving separator 13 via line 15, and entering compressor 22, the latter being employed to maintain the desired operating pressure upon reactor 11. The hydrogen-rich recycle gas stream is then discharged from compressor 22 through line 23 to combine with the naphtha charge stock in line 8, prior to being raised to the desired operating temperature in heater 9. At least a portion of the gaseous phase is withdrawn through control valve 16, in line 17, employed for the purpose of pressure control. The normally liquid hydrocarbon phase, containing light paraffinic and olefinic hydrocarbons and butanes, is withdrawn from separator 13 through line 14 into stabilizer 18. In catalytic reforming processes, the stabilizer is employed primarily for the purpose of controlling the vapor pressure of the stabilized reformate product, through the removal of light paraffinic and olefinic hydrocarbons, and at least a portion of the butanes. The light paraffinic and olefinic hydrocarbons are withdrawn from stabilizer 18 through line 19, the stabilized reformate product being removed via line 20. At least a portion of the stabilized reformate product is recycled through line 20 to combine with the total reaction zone effluent in line 12, prior to the introduction of the latter into separator 13. The amount of stabilized reformate continuing as recycle through line 20, is sufficient to yield a recycle ratio, with respect to the naphtha charge stock entering reactor 11 through line 10, within the range of from about 0.5:1 to about 10.0:1. That quantity of stabilized reformate product, not required by the present invention as liquid recycle, is withdrawn to storage via line 21. Various modifications may be made to the simplified flow pattern illustrated in FIGURE 1. It is not intended that such modifications remove the resulting flow from the broad scope of the present invention. An essential feature is the recycle of stabilized reformate product to combine with the total reaction zone effluent, whereby there is effected a significantly substantial decrease in the quantity of light paraffinic and olefinic hydrocarbons contained in the hydrogen-rich recycle gas phase leaving separator 13 via line 15. As previously described, the overall effect is to decrease the quantity of coke and other heavy hydrocarbonaceous material which becomes deposited upon the catalyst disposed in reactor 11.

Although the method of the present invention is specifically directed to those catalytic composites contacting platinum, hydrocarbon conversion processes which utilize mixtures of two or more, etc. The utilization of such other metals, whether existing in the elemental state, or in metallic component, or mixtures of metallic components. ponent, and carrier material, the latter being a suitable refractory inorganic oxide, and subsequently employed therewith as components of the catalyst. Such other metals include cesium, vanadium, chromium, tungsten, sodium and other alkali metals, silver, rhenium, other metals of Groups VI and VIII of the Periodic Table, and mixtures of two or more etc. The utilization of such other metals, wether existing in the elemental state, or in combination such as the halide, oxide, sulfide, nitrate, etc., is dependent upon the particular situation in which the catalyst is employed. It is understood that the benefits afforded a catalyst containing different metallic components are not equivalent, and that the effect of employing the method of the present invention to the benefit of those catalytic composites containing at least one metallic component from the platinum-group, are not necessarily the same effects observed in regard to some other metallic component, or mixtures of metalic components.

In the interest of simplicity, the following description of the catalytic composite will be limited to platinum-containing catalysts. It is understood that the various aspects discussed are equally well adaptable to other metals of the platinum-group of the Periodic Table. Generally, the amount of the platinum component composited with the catalyst is small as compared to the quantities of the other components combined therewith. Calculated as the element, platinum will generally be present in an amount of from about 0.01% to about 10.0% by weight. Such conversion catalysts are often manufactured to contain halogen selected from the group of chlorine and/or fluorine, which are thought to exist therein in some combined form and to provide an acid-acting function therefor. The halogen, whether chlorine, fluorine or mixtures thereof, is composited with the catalyst in an amount of from about 0.1% to about 8.0% by weight thereof. The addition of these components to the catalytic composite may be effected in any suitable manner which serves to accomplish the desired result. Thus, chlorine and/or fluorine may be added in the form of an acid such as an aqueous solution of hydrogen chloride, hydrogen fluoride, or mixtures thereof. Volatile salts, such as ammonium chloride and/or ammonium fluoride, also afford convenient means of incorporating the chlorine and fluorine into the catalytic composite. The halogen is believed to be combined with one or more of the other components of the catalyst, and is, therefore, generally referred to as combined halogen; the concentrations thereof are, however, computed on the basis of the element.

Whatever the catalytically active components, they are generally composited with a highly refractory inorganic oxide such as alumina, silica, zirconia, magnesia, boria, thoria, titania, strontia, etc., and mixtures of two or more including silica-alumina, alumina-boria, silica-thoria, silica-zirconia-alumina, etc. It is understood that the refractory inorganic oxides hereinabove set forth are intended to be illustrative rather than limiting upon the method of the present invention. It is further understood that these refractory inorganic oxides may be manufactured by any suitable method including separate, successive, or coprecipitation methods of manufacture, or they may be naturally-occurring substances such as ores, sands, clays or earths which may or may not be purified or activated with special treatment.

The particular method employed for the manufacture of the alumina, and/or any of the other refractory inorganic oxides hereinabove set forth, is not considered an essential feature of the present invention. The alumina may be prepared by adding a suitable alkaline reagent such as ammonium hydroxide to a salt of aluminum, such as aluminum chloride, aluminum sulfate, aluminum nitrate, etc. Upon drying, and subsequent calcination at elevated temperatures, the resulting aluminum hydroxide is converted to alumina. The alumina may take the form of any desired shape such as spheres, pills, extrudates, powder, granules, cakes, etc. The preferred form of alumina is the sphere, and alumina spheres may be continuously manufactured by the well-known oil-drop method. This method is described in detail in U.S. Patent No. 2,620,314, issued to James Hoekstra. Where utilized, an alumina-silica carrier material may be manufactured by commingling an aqueous solution of a water-soluble aluminum salt with an acidified solution of water glass. An alumina-silica hydrogel is precipitated from the resultant solution via the addition thereto of a suitable alkaline reagent such as ammonium hydroxide. Following a washing procedure, to remove sodium ions, the precipitate is dried, calcined, and subsequently formed into any of the desired shapes hereinbefore described. Although the addition of halogen is generally accomplished through the utilization of an acid or volatile salt, such halogen may be incorporated into the carrier material during the preparation of the latter. Where the refractory inorganic oxide is prepared from a halide-containing hydrosol, the method of preparation affords a convenient manner of compositing halogen while at the same time manufacturing the refractory inorganic oxide carrier material. In still another method of manufacture, the halogen may be composited with the refractory oxide during the impregnation thereof with the catalytically active metallic components.

Although the precise means by which the platinum component, or other platinum-group metal, is incorporated with the other components of the catalyst, is not known, it is believed that the platinum exists in some physical association or as a chemical complex therewith. Thus, the platinum-group metal may be present as such, or as a chemical compound or in physical association with the alumina or with the other catalytically active metallic components, or in some combination with both. Similarly, where other metallic components from the platinum-group are employed in combination with the platinum, they may be present as such, or as a chemical compound or in physical association with either the refractory inorganic oxide, or the platinum, or both. The method of preparing the catalyst of the present invention is facilitated through the utilization of water-soluble compounds of the platinum-group metals, and composited with the carrier material via impregnating techniques. Thus, where the platinum-group metal is platinum, it may be added to the carrier material by commingling the latter with an aqueous solution of chloroplatinic acid. Other water-soluble compounds of platinum may be utilized within the impregnating solution, and include ammonium chloroplatinate, platinous chloride, platinic chloride, dinitrodiamino platinum, etc. Following the impregnating technique, the carrier material is dried and subjected to a high-temperature calcination procedure.

Briefly, one embodiment of the present invention comprises passing a naphtha charge stock, following fractionation and other pretreatment to provide the desired boiling range, into a reaction zone containing a catalyst comprising from about 0.01% to about 10.0% by weight of platinum, from about 0.1% to about 8.0% by weight of halogen, and alumina, in the presence of hydrogen being recycled at a rate of from about 2 to about 20 mols per mol of liquid hydrocarbon charge. The reaction zone is maintained at a temperature within the range of from about 800° F. to about 1050° F., and under an imposed pressure within the range of from about 300 pounds per square inch to about 900 pounds per square inch. The liquid hourly space velocity, defined as volumes of liquid hydrocarbon charge per volume of catalyst disposed within the reaction zone, will generally lie within the range of from about 0.5 to about 10.0. Lower space velocities are preferred, usually in excess of about 0.5, having an upper limit, however, of about 6.0. The resulting catalytically reformed product is passed in its entirety into a separating zone for the purpose of removing a hydrogen-rich gaseous phase which is recycled to combine with the liquid hydrocarbon charge. The normally liquid hydrocarbons, removed from the separating zone, are subjected to stabilization for the purpose of removing light paraffinic and olefinic hydrocarbons. The resultant stabilized reformate product is recycled, at least in part, to combine with the total reaction zone effluent passing into the separating means. The amount of stabilized reformate recycle is calculated on the basis of the total liquid hydrocarbon charge to the reaction zone, and is within the range of from about 0.5:1 to about 10:1.

A similar procedure is employed when effecting the isomerization of substantially pure low molecular weight hydrocarbons or cycloparaffins. The catalytic composite for the isomerization reactions comprises a refractory inorganic oxide, platinum and combined halogen from the group of chlorine and fluorine. The combined halogen is preferred to be fluorine, and is present in an amount of from about 2.0% to about 5.0% by weight. As hereinbefore set forth, alumina is utilized as the carrier material for the other catalytic components. The operating conditions to be employed within the isomerization zone will depend upon the particular compound being subjected thereto, and will generally be a temperature within the range of about 500° F. to about 900° F., although temperatures within the more limited range of from about 525° F. to about 800° F. are usually preferred. The pressure utilized will range from about 100 pounds per square inch to about 1000 pounds per square inch. The process of the present invention, utilizing the above-described catalyst, is particularly adapted for a so-called fixed bed type process. In such a process, the compound or compounds to be isomerized are passed in upward, downward or radial flow over the catalyst, along with the requisite quantity of hydrogen. The reaction products are then separated from the hydrogen, which is recycled, the normally liquid hydrocarbons being subjected to fractionation and separation from which at least a portion of the final product is recycled to combine with the total reaction zone effluent. In processes for the isomerization of paraffins and cycloparaffins, the liquid hourly space velocity will be maintained within the range of from about 0.1 to about 10.0, and preferably within the range of from about 2.0 to about 5.0.

The following examples are given to further illustrate the process of the present invention, and to indicate the benefits afforded through the utilization thereof. It is not intended that the present invention be limited, beyond the scope and spirit of the appended claims, to the conditions, reagents, or concentrations employed within the examples.

EXAMPLE I

A catalyst was prepared utilizing $\frac{1}{16}$-inch alumina spheres, manufactured in accordance with U.S. Patent No. 2,620,314, issued to James Hoekstra, and containing 0.35% by weight of chlorine. The spheres were intimately commingled with a sufficient quantity of an aqueous solution of hydrogen fluoride to composite therewith 0.35% by weight of fluorine. The halogen-containing spheres were then dried, and subjected to a calcination procedure at a temperature of about 900° F. The calcined spheres were impregnated with an aqueous solution of chloroplatinic acid in an amount sufficient to yield a final catalyst containing 0.75% by weight of platinum, calculated as the element thereof. The impregnated spheres were dried at a temperature of about 300° F., and thereafter calcined in an atmosphere of air at a temperature of about 900° F. This catalyst was placed as a fixed bed in a bench-scale reaction zone maintained under an imposed pressure of about 500 pounds per square inch. Kuwait heavy naphtha, having the properties indicated in Table I, was processed at a liquid hourly space velocity of about 2.0, a recycle gas ratio of 7.0, based upon the quantity of hydrogen within the recycle gas stream, and at a temperature necessary to result in a final product, following debutanization, having an F-1 clear octane rating of 100.0. Following the determination of the temperature required to achieve a debutanized product of this quality, a second operation was effected at the same conditions of operation, except that the recycle gas ratio was increased to 12.0.

TABLE I: CHARGE STOCK AND PRODUCT INSPECTIONS

|  | Charge | Product |
|---|---|---|
| Gravity, ° API at 60° F | 57.9 | 44.6 |
| ASTM D-86 Distillation, ° F.: | | |
| IBP | 210 | 121 |
| 5% | 229 | 141 |
| 10% | 236 | 152 |
| 30% | 255 | 200 |
| 50% | 275 | 250 |
| 70% | 295 | 281 |
| 90% | 320 | 314 |
| 95% | 328 | 330 |
| E.P. | 353 | 398 |
| Octane Ratings: | | |
| F-1 Clear | 34.4 | 100.3 |
| F-1 +3 cc. TEL | 63.3 | 105.1 |
| Hydrocarbon Type Analysis, vol. percent: | | |
| Paraffins | 70 | 34.0 |
| Naphthenes | 18 | |
| Olefins | | 0.5 |
| Aromatics | 12 | 65.5 |

Frequent samples of the debutanized liquid product were taken for the purpose of determining the F-1 clear octane rating, whereby the temperature of the operation was adjusted accordingly. The operation was ended at a catalyst life of about 3.5 barrels per pound, and the catalyst was removed and analyzed for the quantity of carbon deposition.

A third operation was effected under the same conditions, with one exception. The debutanized reformate product was recycled to combine with the total effluent from the reaction zone in an amount to yield a reformate to liquid feed recycle ratio of 4.0. Frequent samples of the debutanized product were taken to determine the F-1 clear octane rating, and the temperature again adjusted to maintain the octane rating at 100.0. This operation was terminated at about 5.0 barrels per pound of catalyst life, with the catalyst being removed for the purpose of analyzing the same for the quantity of carbon deposited thereupon. The results of these analyses are given in the following Table II, along with various liquid recycle process considerations.

TABLE II: RECYCLE PROCESS CONSIDERATIONS

| Reformate/Charge Recycle Ratio | 0 | 4 |
|---|---|---|
| Catalyst Life, BBL/LB | 3.47 | 5.05 |
| Carbon Deposition, weight percent | 3.5 | 0.6 |
| Recycle Gas Ratio, mols | 12.0 | 12.0 |
| Hydrogen Concentration, mol. percent | 53.1 | 70.4 |
| H$_2$/Light Paraffin Mol Ratio | 2.1 | 7.2 |
| Temperature Increase, ° F./BBL/LB | 7 | 0 |

It is immediately noted that the operation effected without recycle of the debutanized reformate product, to combine with the total reaction zone effluent, necessitated a temperature increase of 7° F. for each barrel per pound of catalyst life. During the catalyst life of 5.0 barrels per pound, with liquid recycle operation, there was no increase in reaction zone temperature in order to maintain the debutanized reformate product at 100.0 F-1 clear octane rating. In addition, the catalyst from the operation without liquid recycle had deposited thereupon about 3.5% by weight of carbon, whereas the catalyst from the liquid recycle operation was contaminated with only 0.6% by weight of carbon. A typical analysis of the debutanized reformate product, resulting from the liquid recycle operation, is given in Table I to facilitate a comparison with the original Kuwait heavy naphtha charge stock. These data indicate that the method of recycling at least a portion of the stabilized liquid product to combine with the total reaction zone effluent, results in a longer catalyst life, due to a decrease in carbon deposition, and hence, a more economically favorable process.

EXAMPLE II

This example is given for the purpose of illustrating the stability of the operation employing recycle of the stabilized reformate product, as compared to the operation without such recycle. The catalyst employed in this example was identical to that utilized in Example I. The operating conditions were 300 pounds per square inch and 3.0 liquid hourly space velocity, and the charge stock was Midcontinent heavy naphtha, 52.6° API, 238–378° F. boiling range. As before, the temperature of the catalyst within the reaction zone was adjusted for the purpose of maintaining the octane rating of the debutanized liquid product at a level of 100.0 F-1 clear. Referring now to FIGURE 2, which indicates the stability of the operation with respect to the volumetric yield of debutanized liquid product, it is noted that the operation with liquid recycle as represented by line 102, drawn through points C, D, E and F, is significantly more stable than the operation effected without liquid recycle, as represented by line 101, drawn through points A and B. It should be noted that these lines will intersect at a catalyst life of about 4.5 barrels per pound, indicating that continued operation without liquid recycle will result in the economic loss of debutanized products thereafter. Similarly, with reference to accompanying FIGURE 3, illustrating a comparison between the reactor temperature differential of the operation without liquid recycle (line 103, drawn through points G, H, I, J, K, and L), and the operation with liquid recycle (represented by line 104, drawn through points M, N and T), it should be noted that, at a catalyst life of approximately 4.5 barrels per pound, the operation being effected without liquid recycle will require a reaction zone temperature approximately 23° F. greater than that required while recycling a portion of the stabilized reformate product to combine with the total effluent from the reaction zone. These figures clearly indicate the benefits to be afforded in regard to the stability of operation, and particularly in regard to the severity thereof as indicated by the temperature differential required to maintain a steady-state operation at an octane rating of 100.0 F-1 clear. Of greater significance, referring to FIGURES 2 and 3, is the fact that the operation without liquid recycle was carried out with a recycle gas ratio of 11.0, whereas the operation with liquid recycle employed a recycle gas ratio of only 6.0. Such a significant decrease in hydrogen requirement is totally unexpected in catalytic reforming processes.

The foregoing examples and specification clearly indicate the process of the present invention, and the benefits to be afforded through the utilization of the internal recycle of at least a portion of the stabilized liquid product to combine with the total reaction zone effluent. The operation thus effected results in a significantly extended catalyst life, during which the operation possesses a high degree of stability.

We claim as our invention:
1. A process which comprises
   (a) reforming gasoline boiling hydrocarbons in a reaction zone in the presence of hydrogen and a catalyst containing a platinum group metallic component,
   (b) removing from the reaction zone, the resultant vaporous and liquid effluent comprising reformed gasoline hydrocarbons, normally gaseous hydrocarbons and hydrogen,
   (c) separating said effluent into a hydrogen-rich gas and a liquid reformed gasoline fraction containing normally gaseous hydrocarbons,
   (d) recycling at least a portion of said gas to the reaction zone,
   (e) stabilizing said liquid reformed gasoline fraction to separate normally gaseous hydrocarbons therefrom and form a stabilized gasoline product, (f) commingling a portion of said stabilized gasoline product with the total vaporous and liquid reaction zone effluent prior to the separation thereof as aforesaid, and (g) recovering the remainder of said stabilized gasoline product.

2. The process of claim 1 further characterized in that said catalyst comprises halogen from the group of chlorine and fluorine, and from about 0.01% to about 10.0% by weight of platinum.

3. The process of claim 1 further characterized in that said catalyst comprises halogen from the group of chlorine and fluorine, and from about 0.01% to about 10.0% by weight of palladium.

4. A process which comprises (a) reforming a hydrocarbon charge containing gasoline boiling hydrocarbons in a reaction zone in the presence of hydrogen and a platinum-containing catalyst, (b) removing from the reaction zone the resultant vaporous and liquid effluent comprising reformed gasoline hydrocarbons, normally gaseous hydrocarbons and hydrogen, (c) separating said effluent into a hydrogen-rich gas and a liquid reformed gasoline fraction containing normally gaseous hydrocarbons, (d) recycling at least a portion of said gas to the reaction zone, (e) stabilizing said liquid reformed gasoline fraction to separate normally gaseous hydrocarbons therefrom and form a stabilized gasoline product, (f) commingling a portion of said stabilized gasoline product with the total vaporous and liquid reaction zone effluent prior to the aforesaid separation thereof in an amount to yield a recycle ratio of from about 0.5:1 to about 10.0:1, with respect to said charge containing gasoline boiling hydrocarbons, and (g) recovering the remainder of said stabilized gasoline product.

5. The process of claim 4 further characterized in that said catalyst contains halogen from the group of chlorine, fluorine and mixtures thereof in an amount within the range of about 0.1% to about 8.0% by weight, calculated as the element thereof.

References Cited by the Examiner

UNITED STATES PATENTS

| | | | |
|---|---|---|---|
| 2,668,142 | 2/1954 | Strecker et al. | 208—135 |
| 2,695,264 | 11/1954 | Taff et al. | 208—100 |
| 2,703,308 | 3/1955 | Oblad et al. | 208—60 |
| 2,776,247 | 1/1957 | Anhorn et al. | 208—136 |

OTHER REFERENCES

Hengstebeck, "Petroleum Processing" (1959), published by McGraw-Hill Book Co., Inc., New York, pages 56, 67, 184 to 186, 190 to 193.

DELBERT E. GANTZ, *Primary Examiner.*

ALPHONSO D. SULLIVAN, *Examiner.*

H. LEVINE, *Assistant Examiner.*